(12) United States Patent
Tannenbaum (10) Patent No.: US 7,830,897 B1
(45) Date of Patent: Nov. 9, 2010

(54) SYSTEM AND METHOD FOR ASSIGNING NETWORK ADDRESSES TO USERS BASED ON THEIR RELATIVE SPATIAL RELATIONSHIP

(75) Inventor: David H. Tannenbaum, Dallas, TX (US)

(73) Assignee: Union Beach, L.P., Dallas, TX (US)

( * ) Notice: Subject to any disclaimer, the term of this patent is extended or adjusted under 35 U.S.C. 154(b) by 770 days.

(21) Appl. No.: 11/610,344

(22) Filed: Dec. 13, 2006

(51) Int. Cl.
*H04L 12/28* (2006.01)

(52) U.S. Cl. .................. 370/401; 370/437; 370/463; 709/245

(58) Field of Classification Search ............ 370/395.1, 370/257, 389, 392, 400, 401, 419, 420, 437, 370/463; 709/220–224, 245
See application file for complete search history.

(56) References Cited

U.S. PATENT DOCUMENTS

| | | | |
|---|---|---|---|
| 6,131,119 A * | 10/2000 | Fukui | 709/224 |
| 6,775,369 B1 * | 8/2004 | McClung | 379/211.04 |
| 6,985,942 B2 * | 1/2006 | D'Annunzio et al. | 709/224 |
| 7,003,293 B2 * | 2/2006 | D'Annunzio | 455/431 |
| 7,299,287 B1 * | 11/2007 | Rubinstein et al. | 709/228 |
| 7,340,538 B2 * | 3/2008 | Alappat et al. | 710/5 |
| 7,487,938 B2 * | 2/2009 | Brady et al. | 244/118.5 |
| 2002/0160773 A1 * | 10/2002 | Gresham et al. | 455/431 |
| 2005/0182767 A1 * | 8/2005 | Shoemaker et al. | 707/10 |
| 2005/0216938 A1 * | 9/2005 | Brady et al. | 725/76 |
| 2005/0273823 A1 * | 12/2005 | Brady et al. | 725/76 |
| 2006/0080379 A1 * | 4/2006 | Song et al. | 709/200 |

* cited by examiner

*Primary Examiner*—Pankaj Kumar
*Assistant Examiner*—Duc T Duong
(74) *Attorney, Agent, or Firm*—Fulbright & Jaworski L.L.P.

(57) ABSTRACT

The present invention is directed to a system and method in which advantage is taken of the fact that a great percentage of the general public have on their person some form of communication device. When such communication devices are within certain pre-defined physical locations their relative position can serve to allow communications to be directed to the device simply by using the location of that device as a network address. In one embodiment, the defined space is a public conveyance, such as an airplane, train or bus, having defined seating. In such a situation, the network address for a device is the seat location of the device.

24 Claims, 5 Drawing Sheets

SYSTEM AND METHOD FOR ASSIGNING NETWORK ADDRESSES TO USERS BASED ON THEIR RELATIVE SPATIAL RELATIONSHIP

TECHNICAL FIELD

This disclosure relates to the assignment of network address to random users based upon their relative special relationship one to another. More particularly, there is disclosed systems and methods for use within a defined space for allowing communication among otherwise random users by using network addresses temporarily assigned to the users based upon the physical location of each user with the space.

BACKGROUND OF THE INVENTION

It has now become common for a large segment of the general public to carry within some form of personal communication device. These devices can be elaborate, such as personal computers (PCs), personal digital assistants (PDAs) and cell phones, each having two-way wireless capability, and less elaborate, such as personal memories (PMs) that essentially only store and playback data. These later devices, such as MP3 players and the like, typically communicate with a known host for having data (such as music or videos) downloaded thereto and with a user for playing the music or video. For purposes of discussion herein, the term user's communication device shall mean all such devices whether or not they have built-in third party networking capability.

Since these devices have become prevalent, user's enjoy the convenience of a wide array of communication, entertainment, news updates, etc. Manners aside, people are seen (and heard) talking on their cell phones, or communicating using other communication devices while eating in restaurants, while riding in public conveyances and certainly while driving. As more and more people become electronic savvy the amount of information being conveyed from one to another is exponential. Thus the public in general is receiving a great deal of its information from person electronics carried with them and thus a need exists for an even greater weaving of such personal communication devices into the fabric of everyday living.

BRIEF SUMMARY OF THE INVENTION

The present invention is directed to a system and method in which advantage is taken of the fact that a great percentage of the general public have on their person some form of communication device. When such communication devices are within certain pre-defined physical locations their relative position can serve to allow communications to be directed to the device simply by using the location of that device as a network address.

In one embodiment, the defined space is a public conveyance, such as an airplane, train or bus, having defined seating. In such a situation, the network address for a device is the seat location of the device. For PMs, (devices that have little or no networking capability) the system allows data from a control device to bi-directionally communicate therewith by using the seat association or other physical location as a network address. In situations where a communication device has networking capability that device can selectively communicate with other devices within the defined space by using the seat assignment of the other devices.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
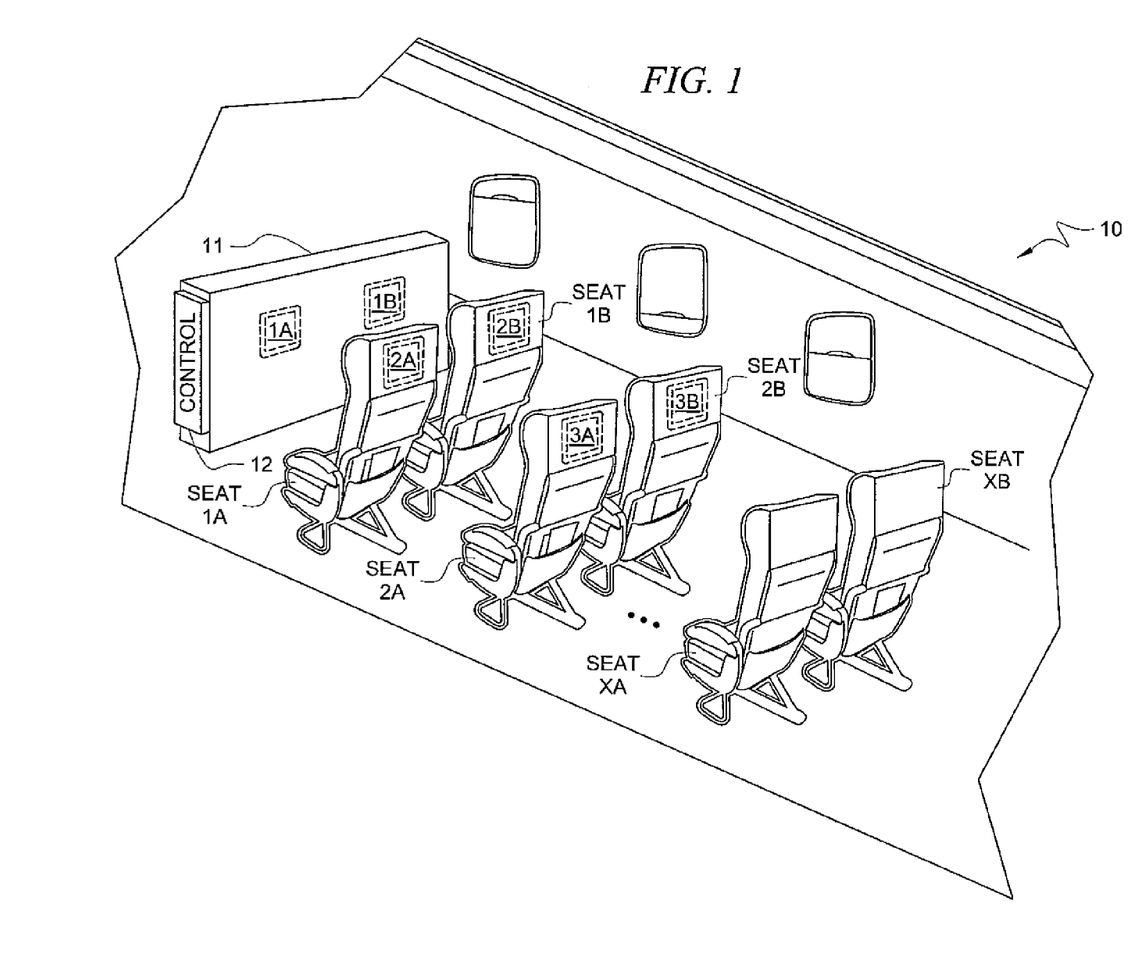
FIG. 1 shows one embodiment of a defined space having various communications devices temporarily associated with some of the physical locations within the space.

FIG. 1 shows one embodiment of a defined space, such as space 10, having various communications devices temporarily associated with some of the physical locations, such as locations 1A, 1B, 2A, 2B, 3A, 3B, XA, and XB, within the space. In the embodiment shown, the physical locations are seats (for example, seats on a common carrier airplane). Positioned in association with each seat is a docking station. In this embodiment, the docking station associated with each seat is positioned in front of the seat. Thus, the docking station associated with seat 1A is positioned on bulkhead 11 in front of seat 1A. Similarly, docking station 2B is shown positioned on the back of seat 1B facing seat 2B. In FIG. 1 docking stations shown in broken lines (such as station 3A) do not have communication devices associated therewith.

Note that while the docking stations can be designed to accommodate PCs, they can also be designed to accommodate a plurality of other communicating devices, including devices that can be connected by wires or even wirelessly, using, for example, the Blue Tooth protocol. Thus, PDAs can become temporarily associated with a docking station as could various PMs, such as, by way of example only, iPODs (™ of Apple Corporation).

One or more central control units, such as control unit 12, is connected into the system, either by hardwire or wirelessly, which control units serve to control communications between and among all docked passenger communication devices. One aspect of such control is the assignment of temporary network address locations to each docked communication device. Thus, a user sitting in row 2, seat A would dock (or otherwise connect) his/her PC (or other communicating device) into docking terminal 2A (on the back of seat 1A). The docked device would then be assigned, for example, the temporary network address of 2A. The network address assignment would advantageously be assigned automatically by, for example, control 12, but the address can be assigned manually by the user, if desired. This would then allow control 12 operating under directions of an attendant, or from an internal memory and processor, to send messages selectively to one or more docked communication devices without having any previous knowledge of the network address (such as an e-mail address or an IP address) of the target device.

Also, if desired, the system can allow any passenger, using his/her own communication device, to communicate with any selected other passenger using the physical location of the target user (such as the seat assignment) as the temporary network address. If desired, the system can be set up, as will be discussed with respect to FIG. 6, so that target users, in order to avoid being disturbed by others, can designate his/her address as open to all other users or open only to select other users or closed to all. Control 12 can be exempt from such restriction so that the system itself can deliver messages to users.

Figure 2:
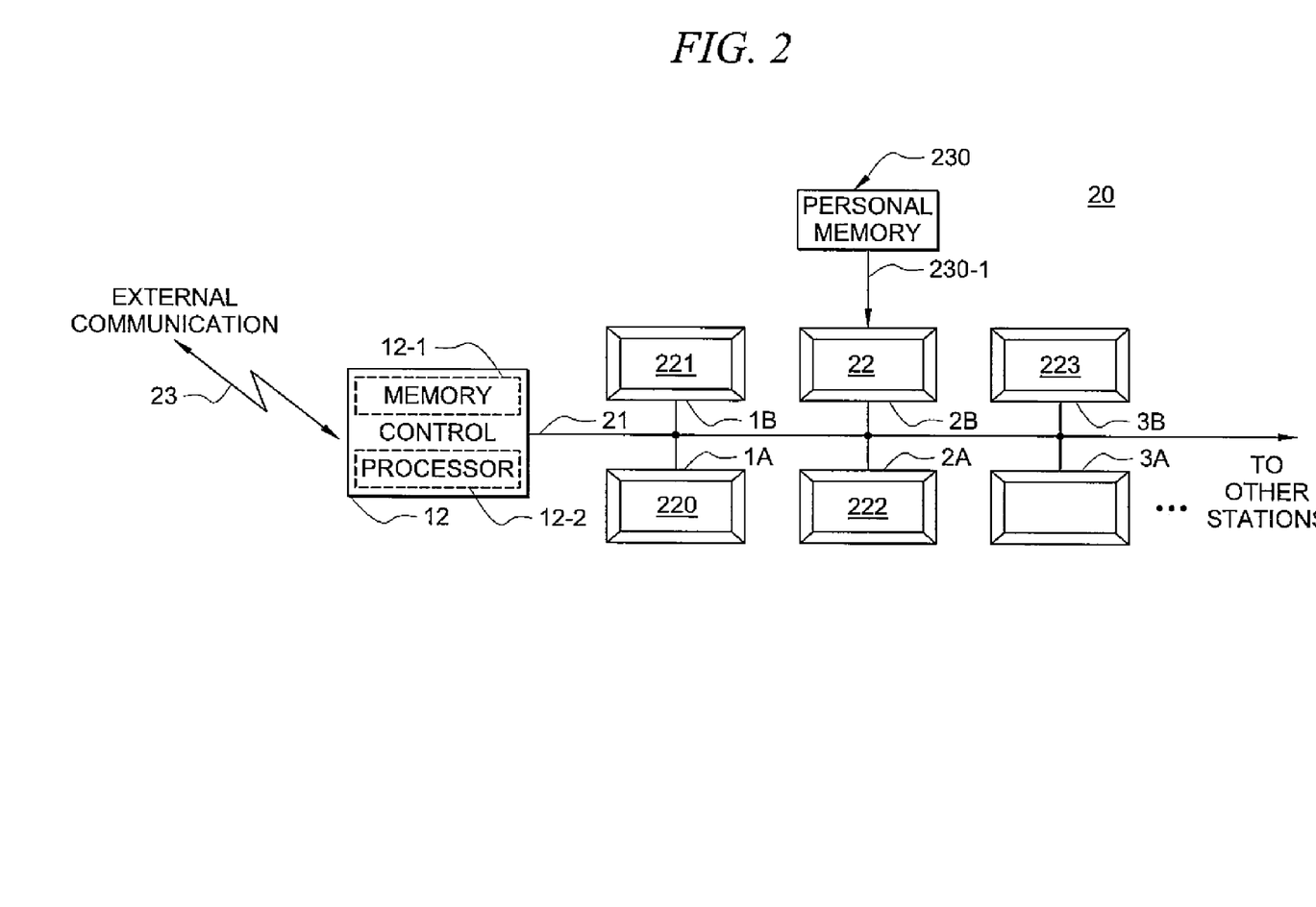
FIG. 2 shows one embodiment of a system for controlling the network for a defined-space address allocation system.

FIG. 2 shows one embodiment of a system, such as system 20, for controlling the network for the defined-space address allocation system shown in FIG. 1. In this embodiment, control 12 contains memory 12-1, processor 12-2, and backbone communication path 21 interconnecting the permanently installed docking stations, such as docking stations 1A, 1B, 2A, 2B, 3A, and 3B. As shown, user communicating device 220 is shown docked in terminal 1A, device 221 in terminal 1B, device 222 in terminal 2A, and device 223 in terminal 3A. Each of these devices have their own screen and are positioned in front of the user so that the user may view the screen while the device is docked. One or more of these devices can be PCs which plug into connectors in the docking station in the well-known manner such that the normally available ports of the PC (or PDA or other device) become attached to the backbone network bus for communication purposes.

User device 230, which is a PM, either has no screen or has a relatively small screen so the user has opted to use a mounted screen, such as screen 22, associated with seat 2B for viewing video and graphics either from memory internal to device 230 or from control 12, or even possibly from a location remote from the confined space. This screen can be part of the docking station, or can be a screen rented (or provided without cost) on a temporary basis for the duration of the trip. In such an event, user's communication device 230 is connected either by wireline (jack connection not shown) or wirelessly, to the docking station via connection 230-1. When so connected, the network address of device 230 becomes 2B so that, if desired, control 12 can communicate selectively with the user at seat 213 via device 230. This communication can be by video (screen 22 or if available, the screen of device 230) or by audio into memory of device 230 and then from that device to the ear of the user via a communication path to the user's ear, perhaps via a headphone (not shown). For user's with such communication paths directly to their ears, audible announcements can be selectively (or communally) directed by an attendant.

Figure 3A:
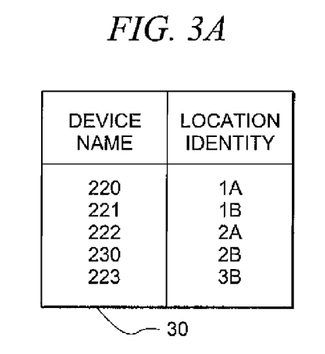
FIGS. 3A and 3B show embodiments of memory associations for address assignments in the system shown in FIG. 2.
Figure 3B:
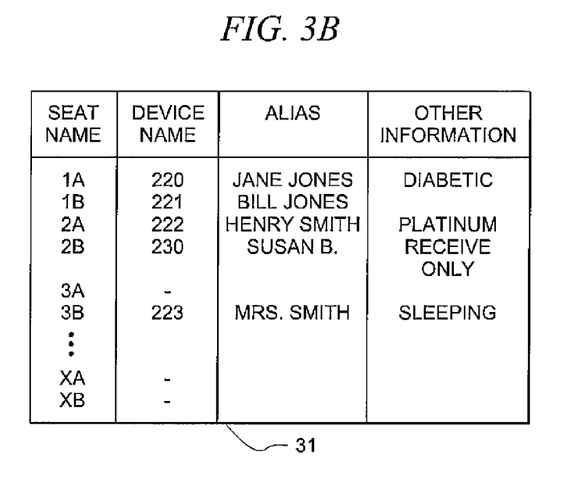

FIGS. 3A and 3B show embodiments of memory associations for address assignments in the system shown in FIG. 1. Some of the information available to the attendant and/or to the user's screen, can be contained in memory 12-1 and some of the information can come from external sources via link 23. These external sources can be remote databases, such as, for example, frequent flier databases, home office reservation systems and the like.

Chart 30 shows one example of a data display for an attendant where the device name, which could be the user's name as obtained from home office records, or from an electronic version of the flight manifest, is displayed in conjunction with the seat assignment. This would then show an attendant which users have devices docked in their respective seat locations.

Chart 31 shows a more elaborate display organized by seat assignment. This chart serves to display names and other pertinent information pertaining to each passenger who has a device docked in the system. The other information can be, for example, movie preferences, meal preferences, music preferences, flight connection information, etc. The system then can send individual messages to selected passengers pertaining to their personal information. Thus, connecting flight information and the like can be provided on an individual basis. Also, as will be more fully discussed, the screens of each user's device can be tailored for that user. Hearing or visually impaired users can have their respective messages tailored to their specific needs. Also, as can be seen in chart 31 for seat 3B, Mrs. Smith has sent a message that she is sleeping and thus messages to her of a non-critical nature should be withheld until she is ready to receive such messages.

Figure 4:
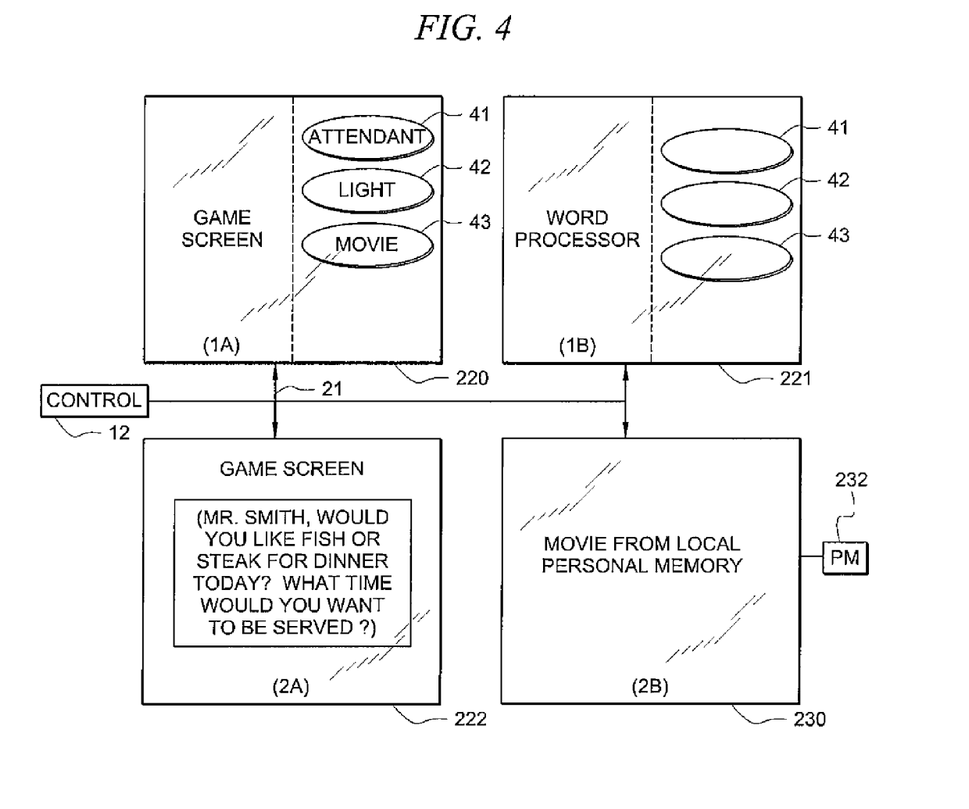
FIG. 4 shows embodiments of displays at various locations within a confined space.

FIG. 4 shows embodiments of displays at various locations within a confined space. Thus, display 220 (at seat 1A) and display 221 (at seat 1B) each shows a split screen with the controls for lights, calling the attendant, entertainment selection on the right side of the screen and the left side of the screen devoted to personal activities, such as game playing, word processing, etc. Note that the displays at the right might be interactive such that the user by touching a button can control a desired function of the aircraft.

Screen 222 (seat 2A) is displaying a full game screen while screen 22 (seat 2B) is displaying a movie that had been stored on PM 230. Note that Mr. Smith, in seat 2A is a Platinum customer (see chart 31 FIG. 3B) and thus is entitled to a few extra perks. Thus, the attendant has asked him privately, via his screen (using the temporarily assigned network address associated with seat 2A) what his preference is for dinner and what time he wishes to be served.

Figure 5:
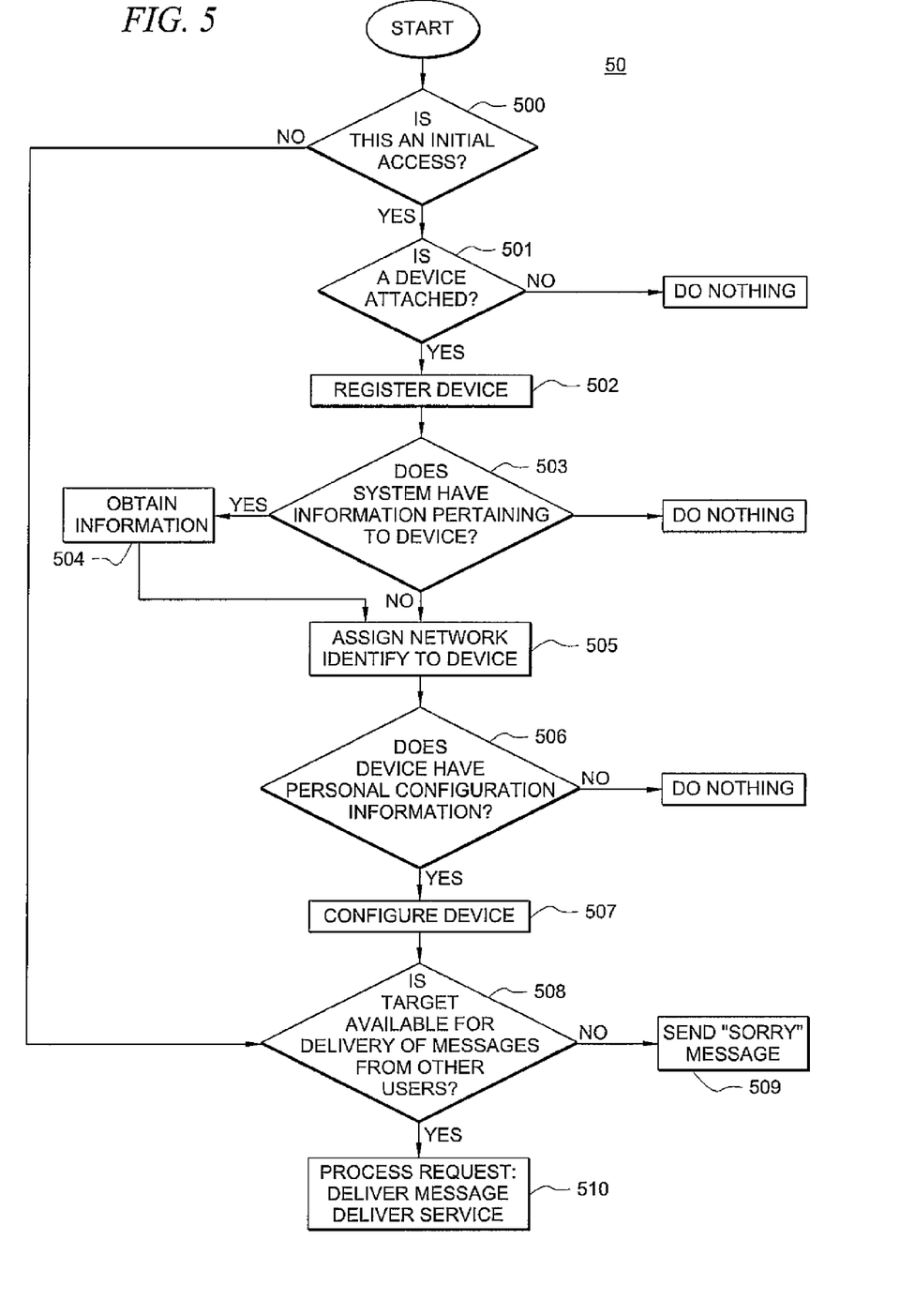
FIGS. 5 and 6 show embodiments of methods for controlling a defined space network address allocation system.
Figure 6:
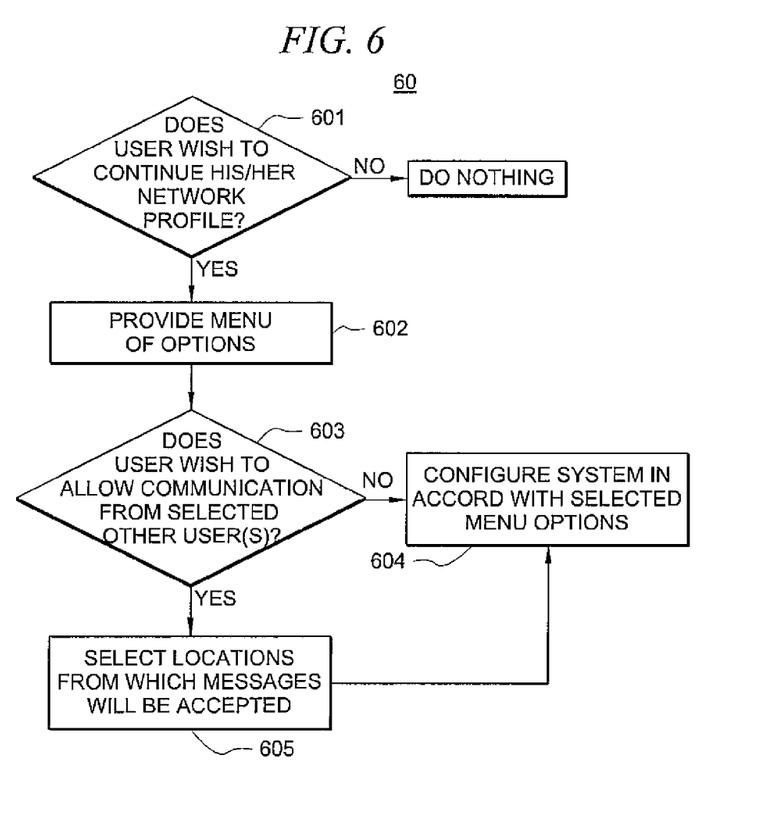

FIGS. 5 and 6 show embodiments of a method, such as methods 50 and 60, for controlling a defined space network address allocation system. With respect to FIG. 5, upon detection of a request for service, process 500 determines if this request occurred because of a docking operation or because of an actual request initiated by the user. If this is an initial request, then process 501 determines if a user's device is attached at a specific location. If it is, process 502 registers the device as being present. Process 502 also extracts from the device any specific information that is available about the device or about the user. In some embodiments it may be helpful to have loaded on the device specific software and/or hardware to facilitate the connection of the device to the docking station and to help identify the user and the user and the user's preferences. The software aspect of this can be pre-loaded or can be downloaded from control 12.

Process 503, if desired, can determine if the system, either in memory 12-1, or in a remote database, has information pertaining to this user. If so, that data is obtained via process 504 for use, as appropriate, while the user is attached to the network.

Process 505 then assigns a network identity to the connected device. For ease of discussion, this identity can be thought of as being the same as the physical location of the device. Thus the device connected to docking station 1A would have network location 1A. This convention is good so that other user's can easily send messages to a selected device without knowing any network information about the target device other than its physical location. Note that while the network address has the same name as the physical address for ease of user's, behind the scenes any address convention can be used and thus the physical address can be thought of as a virtual address. Accordingly, in some embodiments when the user's device is docked, its "normal" network address can be detected by control 12 and then used internally by correlating it to the physical location of the device. In this way, any other user would not need to know, and would have no access to, the real network address of the target device.

Process 506 checks to determine if the device has personal configuration information or other special needs set up. These needs can range from screen parameters to attendant preferences. Such preferences can be, for example, "I desire water," or "I like my coffee with sugar and cream". The requests could be for specific movies, music or other entertainment or could be instructions such as, "I am hearing impaired". Process 507 configures the device and the system to respect the requests of each user.

Process 508 processes requests for service which requests include requests to deliver a message (or a game) to another user. Process 508 also coordinates interactive games that are being played between or among various other users. Note that if a particular target user has indicated that it will not accept messages from selected other locations (or alternatively, has selected which user's messages will be allowed) and this particular sending user is not on the accepted list process 509 will return a not deliverable message, for example in the form, "sorry the target user is not accepting messages," notice.

Process 510 operates under direction of control 12 to deliver messages to the selectively named location(s) from a user and also to accept and process service requests.

With respect to FIG. 6, process 601 determines if a user wishes to configure his/her network profile. If so, process 602, for example, provides a menu of choices for user selection. This menu can be as extensive as desired. One of the menu choices can be, for example, as shown in process 603 where the user desires to control which other location(s) can communicate with this location. Once the user makes the proper selection process 604 working in conjunction with process 605, operates to configure the system to selectively allow communications from other locations, including, as discussed above, external locations. In some embodiments, this configuration can be part of the profile stored in the user's device. Also, the configuration can be, if desired, partially automatic since presumably the system knows which parties are traveling together (same locator number, contained in a system maintained profile, etc) and using this information the system can allow intercommunication among such affiliated parties.

Figure 7:
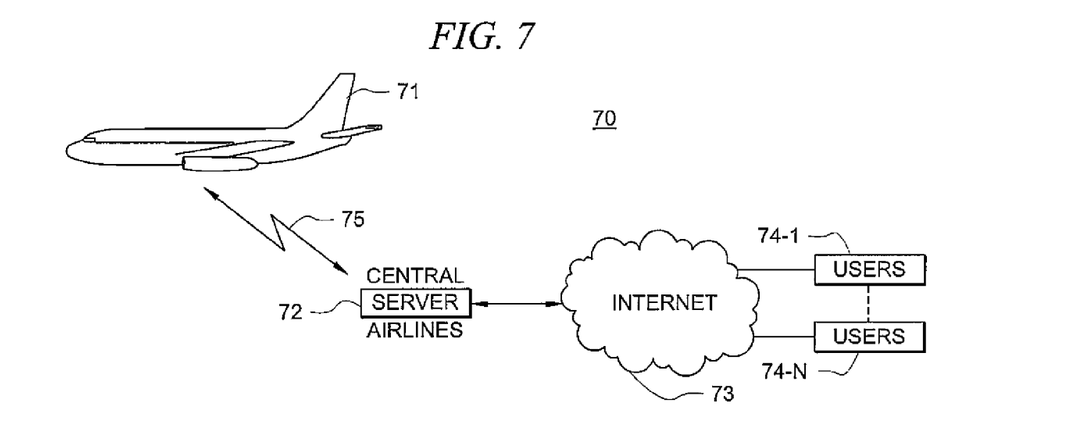
FIG. 7 shows one embodiment in which devices external to the confined space can communicate with devices within the confined space.

FIG. 7 shows one embodiment 70 in which a user, such as any user 74-1 to 74-N, external to the confined space can communicate with users within the confined space. This can occur, for example, by a user on the ground, such as user 74-1, sending a message to a passenger, say on Central Airlines flight 123, by addressing the message to "CA flight 123, seat 2B". That message would be delivered, in the embodiment shown, via Internet 73 to server 72 of Central Airlines. Server 72, in turn, forwards the message to the proper flight either by direct wireless communication 75 over a private network or via a public network. When the message arrives at control 12 (FIG. 2), the message would be delivered to the intended user at the proper seat location. Note that either server 72 or control 12, or a combination thereof, could make the transition from the address specified by user 74-1 and the actual confined space network address.

In one embodiment, user 74-1 would log-on to server 72 via a public network, such as Internet 73, and access a menu of options, one of which option would give the user the ability to send messages from his/her communication device (not shown) to a particular passenger. Assuming user 74-1 knew the flight and seat location then that information could be provided. If the user only knew the name or any other descriptive information (such as an email address) then server 72 could look up the flight and/or the seat and using that information (assuming the traveler had registered his/her descriptive information with the server or with the airline company) so as to allow user 74-1 to send a message to the desired recipient. In some situations, the message would be inputted directly into server 72 by the logged-on user (in our example, user 74-1). For privacy reasons, server 72 might not be able to let user 74-1 know that the desired user is on a particular flight or on any flight, but if the user is, in fact on a flight then the message would be delivered. Note also that server 72 might not be limited to a particular airline but, in fact, might be available for all or many airlines and/or other defined space situations. Also, in some situations, the target recipient might, when making a reservation, indicate the identity of certain others who would be allowed to send messages during the flight time. These designations could, for example, be by name, email address, work identity or other affiliation, or this list could be users identified in a profile on file with a common carrier, or users on a more general list of acceptable users, such as law enforcement, banks, government employees, etc., or the list could include anyone who had access to a specific passcode. Any such list would be stored, for example, within storage in conjunction with the server. In this manner, travelers could give broad access to users to send the traveler messages without compromising his/her security and without anyone actually knowing his/her flight plans.

While in the foregoing discussion the examples that were used were physically confined spaces, such as within an aircraft or classroom, the same principals can be applied to any situation where the address of the message is delivered to an occupant of a defined space based on the occupant's physical location on a temporary basis within that space. Thus, aircraft, or fast-moving objects such as rockets that move across wide physical spaces can be thought of as being temporarily assigned to specific locations within that space for certain periods of time. Thus, messages can be directed to such a vehicle based upon the space sector assigned to that vehicle at the time the message is to be delivered or at the time the message is sent. The server of FIG. 7 can be used to direct such messages based, at least in part, on the anticipated physical location of a desired message recipient within a certain space at a particular time. The message thus can be delivered based on the address of the expected location (or the current physical location) as apposed to (or in addition to) an address permanently associated with the target recipient. In this manner, user's can be known to the outside world by their temporarily assigned physical location-based address name.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A communication network comprising:
   a plurality of docking stations, each said docking station having a pre-assigned unique IP address assigned thereto;
   a docking station interconnection structure for allowing a first networking communication device to communicate with a first location communication device that is temporarily connected to a first docking station having a first pre-assigned network address, said first pre-assigned network IP address of said first docking station being used to direct said communication to and from said first local communication device, wherein said interconnection structure is further operable for allowing said temporarily connected communication device to establish a temporary communication connection with a second local communication device temporarily connected to a second docking station having a second pre-assigned network address, said temporary communication connection also using said second pre-assigned network address of said second docking station, and wherein said network is used within a physically confined space and wherein said first and second pre-assigned network addresses each correspond to a specific seat assignments within said space, said network further comprising:
   means for allowing selective communications only among locations within said confined space which locations have a pre-defined affinity to each other.

2. The network of claim 1 wherein said first communication device comprises:
   a processor for selectively delivering messages to any of said communication devices connected to any of said docking stations using said pre-assigned unique address of each said docking station.

3. The network of claim 2 further comprising:
   a memory for storing therein data specific to a particular communication device, said data retrievable based on an identity of said specific communication device.

4. The network of claim 2 wherein said processor is further operable for providing selective entertainment to any said connected communication device, said selective entertainment delivered under control of said network address of said docking station to which said selected communication device is temporarily connected.

5. The network of claim 2 wherein said processor further comprises:
   means for allowing any of said communication devices to communicate with selected equipment within said physically confined space.

6. The network of claim 1 wherein said first communication device is external to said confined space and wherein said network further comprising:
   a server for allowing said first communication device to deliver messages to said temporarily connected communication device using said temporarily assigned network address without said first communication device knowing said temporary location or said temporarily assigned network address.

7. A communication system for use in a confined space, said confined space having therein a plurality of positional assignments, said system comprising:
   a plurality of communication device docking stations, each said docking station individually associated with one of said positional assignments;
   means for assigning a unique network IP address to each said docking station;
   means for assigning said unique IP address of a docking station to a communication device while said communication device is temporarily connected to said docking station, and
   means controlled at least in part by said assigned unique network IP addresses for allowing selective communication among said communication devices temporarily docked in said docking devices, said selective communication limited to communication among devices within said confined space having a pre-defined affinity to each other.

8. The system of claim 7 further comprising:
   a processor common to said docking stations, said processor operable for controlling at least a portion of the operation of any temporarily docked communication devices.

9. An entertainment system comprising:
   a fixed plurality of docking terminals, each terminal having a unique identity; and
   network control for allowing a user supplied computing device docked with a particular terminal of said plurality of terminals to communicate with any other user supplied computing device docked with any other terminal of said plurality of terminals using said unique identity of said docked devices as address locations so as to facilitate said inter-device communication without regard to any address information provided by each said computing device.

10. The entertainment system of claim 9 further comprising:
    a device for selectively communicating with any docked computing device, any said selection using said unique identity of said docking terminal to which said device is docked.

11. A system for controlling communication with travelers, said system comprising a server; a public network connection to said server operable for allowing users to log-on to said server; said server operable for accepting messages from a logged-on user, said messages directed to a traveler located within a common carrier; said common carrier having therein passenger seat locations for said travelers, said messages identifying said traveler by descriptive information, said descriptive information containing a seat location within said common carrier of a traveler; and means for delivering said message to said traveler within said common carrier, said message being delivered based, at least in part, by a temporarily assigned seat location of said traveler within said common carrier.

12. The system of claim 11 wherein said server is further operable for accepting messages from only certain ones of said logged-on users.

13. The system of claim 11 wherein said message is delivered from said server via a private network.

14. The system of claim 11 wherein said descriptive information comprises at least a seat assignment within said common carrier.

15. A system for controlling communication with devices which continually change their position in space, said system comprising:
- a server;
- a public network connection to said server operable for allowing users to log-on to said server;
- said server operable for accepting messages from a logged-on user, said messages directed to one of said continually changing devices; said messages identifying said device by descriptive location information; and
- means for delivering said message to said one identified device, said message being delivered based, at least in part, by an address identifying a temporarily assigned location of said device, said address being assigned to said one identified device by virtue of the fact that said one identified device is located at a specific physical location without requiring a user of said device to input said physical location.

16. The system of claim 15 wherein said message to said identified device is delivered from said server via a private network.

17. The system of claim 15 wherein said descriptive information comprises at least a seat assignment within a known location.

18. A method of controlling communications among a plurality of pre-defined physical locations; said method comprising the processor controlled method of:
- temporarily connecting a communication device, under control of said user and said processor, at any of said pre-defined physical locations to a network connection associated with said pre-defined location, said network connection having a pre-defined network address;
- assigning said network address to said connected communication device;
- allowing selective communication between any said connected communication device and at least one other communication device connected to said network, said selective communication facilitated by said assigned network address;
- wherein said at least one other communicating device is a command device and wherein said method further comprises:
- monitoring from said command device at least certain operations of any of said communicating devices connected to said network;
- providing to all said connected communicating devices a menu of selectable items;
- allowing any of said connected communicating devices to select from said menu to either receive or send communications in accordance with said selection and wherein at least one of said communication devices contains an identity of a user of said at least one communication device independent from said network address and wherein said method further comprises:
- registering with said command device the presence of a user at a particular network assigned address, said user identified, at least in part, by said user identity contained within said at least one communication device.

19. The processor controlled method of claim 18 further comprising:
- recalling from storage data pertaining individually to each said identified user; and
- selectively providing to users information content tailored to said recalled data pertaining to said identified user.

20. The processor controlled method of claim 18 further comprising:
- allowing any of said connected communicating devices to communicate only with pre-affiliated other ones of said communicating devices.

21. A system for controlling communication from users outside a common carrier with travelers within a common carrier, said system comprising:
- a server for accepting from one of said outside users identification information of a specific traveler within a common carrier; and
- a processor for effectuating a data communication connection from a computing device associated with said one outside user to a computing device associated with said traveler, said connection based, at least in part, by a temporarily assigned location of said traveler within said common carrier, said temporarily assigned location being determined, at least in part by said identification information.

22. The system of claim 21 wherein said traveler identification information comprises said traveler's seat assignment.

23. The system of claim 21 further comprising;
- a control device for allowing an attendant within said common carrier to establish a private communication connection to a selected traveler by using said traveler's identification information.

24. The system of claim 23 wherein said traveler identification information comprises said traveler's seat assignment.

* * * * *